United States Patent [19]

Yamamori et al.

[11] Patent Number: 4,677,878
[45] Date of Patent: Jul. 7, 1987

[54] AN HYDRAULIC TRANSMISSION CONTROL SYSTEM HAVING DIFFERENT STATE CORRESPONDING TO DIFFERENT OCTANE FUELS

[75] Inventors: Takahiro Yamamori, Tokyo; Yasuo Takagi; Junichi Furukawa, both of Yokohama, all of Japan

[73] Assignee: Nissan Motor Co., Ltd., Yokohama, Japan

[21] Appl. No.: 725,330

[22] Filed: Apr. 19, 1985

[30] Foreign Application Priority Data

Apr. 24, 1984 [JP] Japan .................................. 59-81192
May 18, 1984 [JP] Japan .................................. 59-98836

[51] Int. Cl.⁴ .......................................... B60K 41/16
[52] U.S. Cl. ........................................ 74/861; 74/868; 123/425
[58] Field of Search ................. 123/425, 435; 74/856, 74/861, 867, 868, 869

[56] References Cited

U.S. PATENT DOCUMENTS

| 4,267,750 | 5/1981 | Espenschied et al. ............ 74/861 X |
| 4,430,911 | 2/1984 | Morscheck ........................ 74/861 X |
| 4,501,137 | 2/1985 | Aoki et al. ...................... 123/425 X |
| 4,501,173 | 2/1985 | Honig ................................... 74/868 |
| 4,512,310 | 4/1985 | Haraguchi et al. ................. 123/425 |
| 4,513,717 | 4/1985 | Kobayashi ........................... 123/425 |
| 4,519,790 | 5/1985 | Yamamori et al. .................... 474/18 |

FOREIGN PATENT DOCUMENTS

| 0045922 | 2/1982 | European Pat. Off. ............. 74/868 |
| 2435610 | 2/1975 | Fed. Rep. of Germany ........ 74/869 |
| 2625770 | 12/1977 | Fed. Rep. of Germany ........ 74/861 |
| 2153907 | 1/1978 | Fed. Rep. of Germany ........ 74/868 |
| 2818871 | 11/1978 | Fed. Rep. of Germany ........ 74/861 |
| 2023877 | 11/1978 | Fed. Rep. of Germany ........ 74/861 |
| 2524557 | 10/1983 | France ................................ 123/425 |
| 54-132062 | 4/1978 | Japan . |
| 54-157930 | 5/1978 | Japan . |
| 58-143169 | 2/1982 | Japan . |
| 58-196373 | 5/1982 | Japan . |
| 144338 | 9/1982 | Japan .................................... 74/869 |
| 138262 | 8/1983 | Japan .................................. 123/425 |

Primary Examiner—Rodney H. Bonck
Assistant Examiner—Dwight G. Diehl
Attorney, Agent, or Firm—Schwartz, Jeffery, Schwaab, Mack, Blumenthal & Evans

[57] ABSTRACT

Power output produced by an engine changes depending upon different fuel, in octane number, supplied thereto. In order to meet this change in the engine power output, a transmission drivingly connected to the engine is selectively set at different states, each corresponding to the fuel supplied to the engine.

10 Claims, 6 Drawing Figures

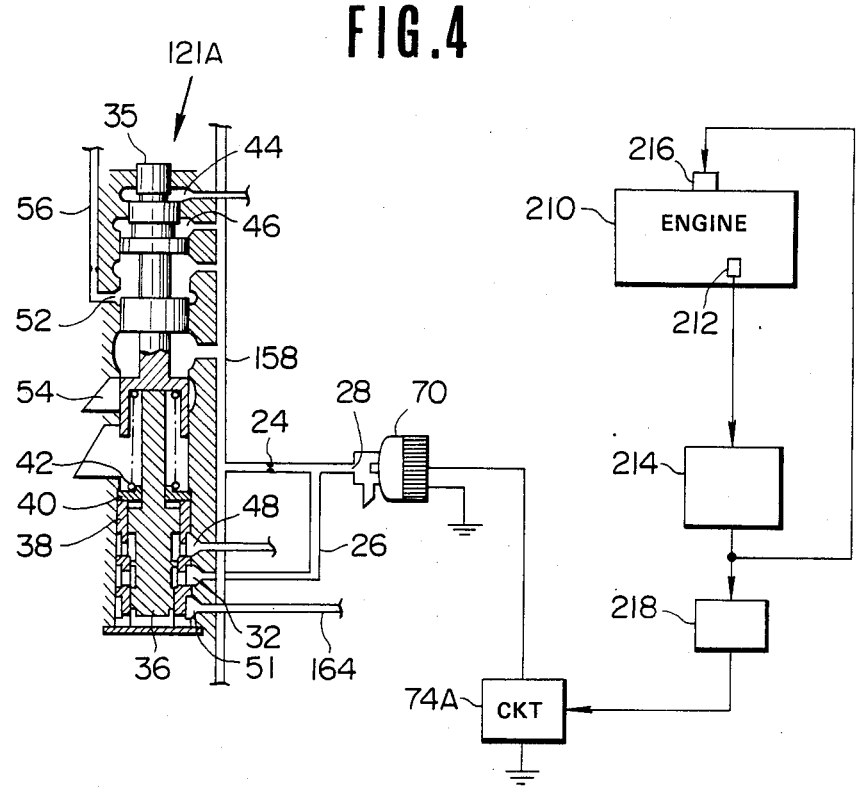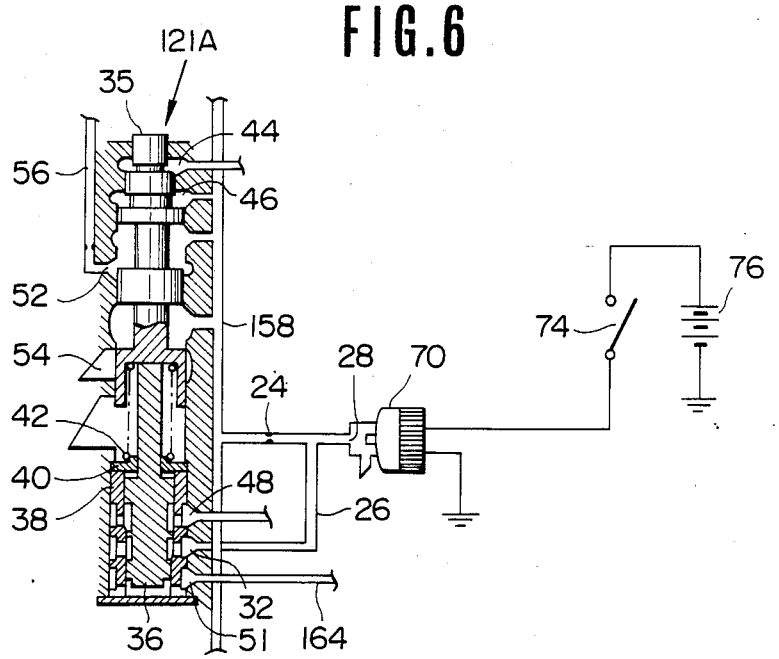

HYDRAULIC TRANSMISSION CONTROL SYSTEM HAVING DIFFERENT STATE CORRESPONDING TO DIFFERENT OCTANE FUELS

BACKGROUND OF THE INVENTION

The present invention relates to a vehicle having a transmission and an engine whose tendency to knock differs from one fuel to another different in octane number.

Tendency of engine to knock differs from one fuel to another in octane number. Thus, in a vehicle having a transmission drivingly connected to such an engine, it is the conventional practice to set the transmission at a single state corresponding to fuel supplied to the engine.

In a known vehicle having a continuously variable transmission disclosed in laid-open Japanese patent application 54-157930, a ratio between the rotational speed of a driving pulley and the rotational speed of a follower pulley is adjusted to a desired value by controlling distribution of fluid pressure between a fluid pressure chamber of the driving pulley and a fluid pressure chamber of the following pulley and thus controlling the distance of each of V-shaped pulley grooves receiving a V-belt in response to various signals, including an engine speed indicative signal, representing an operating state of the vehicle. In this known transmission, a shifting speed at which the transmission effects shifting from one ratio to another is constant under the same condition and is dependent upon rate of change in fluid pressure supplied to each of fluid pressure chambers of the driving and follower pulleys. This shifting speed should be determined taking into account the tendency of the engine to knock and thus should vary from one case where regular octane fuel (octane number ranging from 75-85) is used to another case where high octane fuel (octane number above 85) is used because the tendency of engine to knock differs from the regular octane fuel to the high octane fuel. Commonly, a shifting schedule of the continuously variable transmission is set such that the engine operates at a speed falling into a low speed range. In setting the shifting speed, if it is set high as quick as possible to such a degree that the tendency of the engine to knock remain at a low allowable level so as to meet the case where it operates on fuel having a high octane number, the tendency of the engine to knock will exceed the allowable level when it is supplied with fuel having a low or regular octane number if the transmission effects shifting toward a small ratio to suppress the engine speed because the shifting toward the small ratio is effected at the same and fast speed, too. If, the shifting speed is set slow enough to lower the tendency of the engine to knock so as to meet the case where the engine operates on the regular octane fuel, the fuel is wasted during shifting toward a small ratio in the case where the engine is supplied with the high octane fuel because it takes a time to complete the shifting to the small ratio so that engine speed remains high during this period of shifting. Therefore, it is hardly possible to set the shifting speed at a value which meets the case where the regular octane fuel is used as well as the case where the high octane fuel is used.

This problem also arises in a vehicle having a discretely variable automatic transmission. If a shifting point at which the automatic transmission shifts is set at a low vehicle speed so as to effect shifting at a low engine speed range for the purpose of improving fuel consumption, the engine tends to knock in the case where regular octane fuel is used. If the shifting point is set at a high vehicle speed, the tendency of the engine to knock is suppressed in the case where the regular octane fuel is used, but the fuel is consumed at an unnecessarily high rate.

With the same engine, a high power output is produced if the engine operates on high octane fuel as compared to an engine power output produced if the engine operates or regular on low octane fuel. The spark timing of the engine should be adjusted to different values corresponding to the use of high octane fuel and that of regular octane fuel, respectively. Laid open Japanese patent application 58-143169 discloses an engine wherein the spark timing is automatically adjusted to different values corresponding to the use of the high octane fuel and that of the regular octane fuel by a control unit employing a knock sensor.

Line pressure of the automatic transmission is variable in a pattern corresponding to the pattern of variation of the power output of the engine. If the line pressure is adjusted to meet the pattern of the power output of the engine when it operates on high octane fuel, the magnitude of the line pressure becomes excessively large when the engine is to operate on regular octane fuel, resulting in an increase in shocks during shifting. If the line pressure is adjusted to meet the pattern of the power output of the engine when it operates on the regular octane fuel, the magnitude of the line pressure becomes too low when the engine is to operate on the high octane fuel, failing to provide a sufficiently high capacity of each of the frictional units, resulting in a slip and baking of the unit.

The present invention, therefore, aims at solving the above mentioned problems arising when an engine operates on different kinds of fuel in octane number selectively.

SUMMARY OF THE INVENTION

An object of the present invention is to improve a transmission drivingly connected to an engine of a vehicle such that the transmission is selectively set at different states, each corresponding to fuel supplied to the engine.

According to the present invention, there is provided, in a vehicle having a road wheel and an engine, wherein the tendency of the engine to knock differs on octane number of fuel which the engine operates on:

a transmission having an input member drivingly connected to the engine to receive the output produced by the engine and an output member drivingly connected to the road wheel;

the transmission being adapted to effect shifting in ratio between the rotational speed of the input member and the rotational speed of the output member, means for hydraulically controlling said transmission;

means adapted to be operated when there occurs a change in octane number of fuel which the engine operates on for generating a fuel engine number indicative signal; and electro-hydraulic transducer means including a solenoid operatively coupled with said fuel octane number indicative signal generating means for modifying operation of said hydraulically controlling means in response to said fuel octane number indicative signal.

A specific aspect of the present invention is in the provision of a change-over valve having a first position wherein a restricted fluid flow communication of a shift control valve with a pulley cylinder fluid pressure chamber is established and a second position wherein an unrestricted fluid flow communication of the shift control valve with the pulley cylinder fluid pressure chamber; an actuator operatively coupled with the change-over valve to shift it from one to the other of the first and second positions thereof; and means for activating the actuator, whereby a continuously variable transmission shifts at a quick speed when the change-over valve assumes the second position thereof or at a less quick or slow speed when the change-over valve assumes the first position thereof.

Another specific aspect of the present invention is in the provision of a shift valve shiftable between a downshift position and an upshift position for causing a transmission to effect shifting in accordance with a first predetermined schedule involving a vehicle speed; means for modifying when activated, the operation of the shift valve to change the first schedule to a second predetermined schedule and causing the transmission to effect shifting in accordance with the second predetermined schedule; and means for activating the modifying means.

Still another specific aspect of the present invention is in the provision of a pressure regulator valve for generating a first fluid pressure which is vasriable in a first pattern corresponding approximately to the pattern of variation of power output of an engine, the pressure regulator valve supplying the first fluid pressure to a plurality of frictional units of a transmission; means for modifying the operation of the pressure regulator valve, when activated, to change the first predetermined pattern of variation of the first fluid pressure to a second predetermined pattern and causing the pressure regulator valve to supply a second fluid pressure variable in the second predetermined pattern to the plurality of frictional units; and means for activating the modifying means.

BRIEF DESCRIPTION OF THE DRAWINGS

FIG. 4 is a fragmentary view of a hydraulic control system similar to FIG. 2 showing a fourth embodiment;

FIG. 6 is a similar view to FIG. 4 showing a fifth embodiment.

DESCRIPTION OF THE PREFERRED EMBODIMENTS

Hereinafter, the present invention is described in connection with a plurality of embodiments.

First Embodiment

Figure 1:
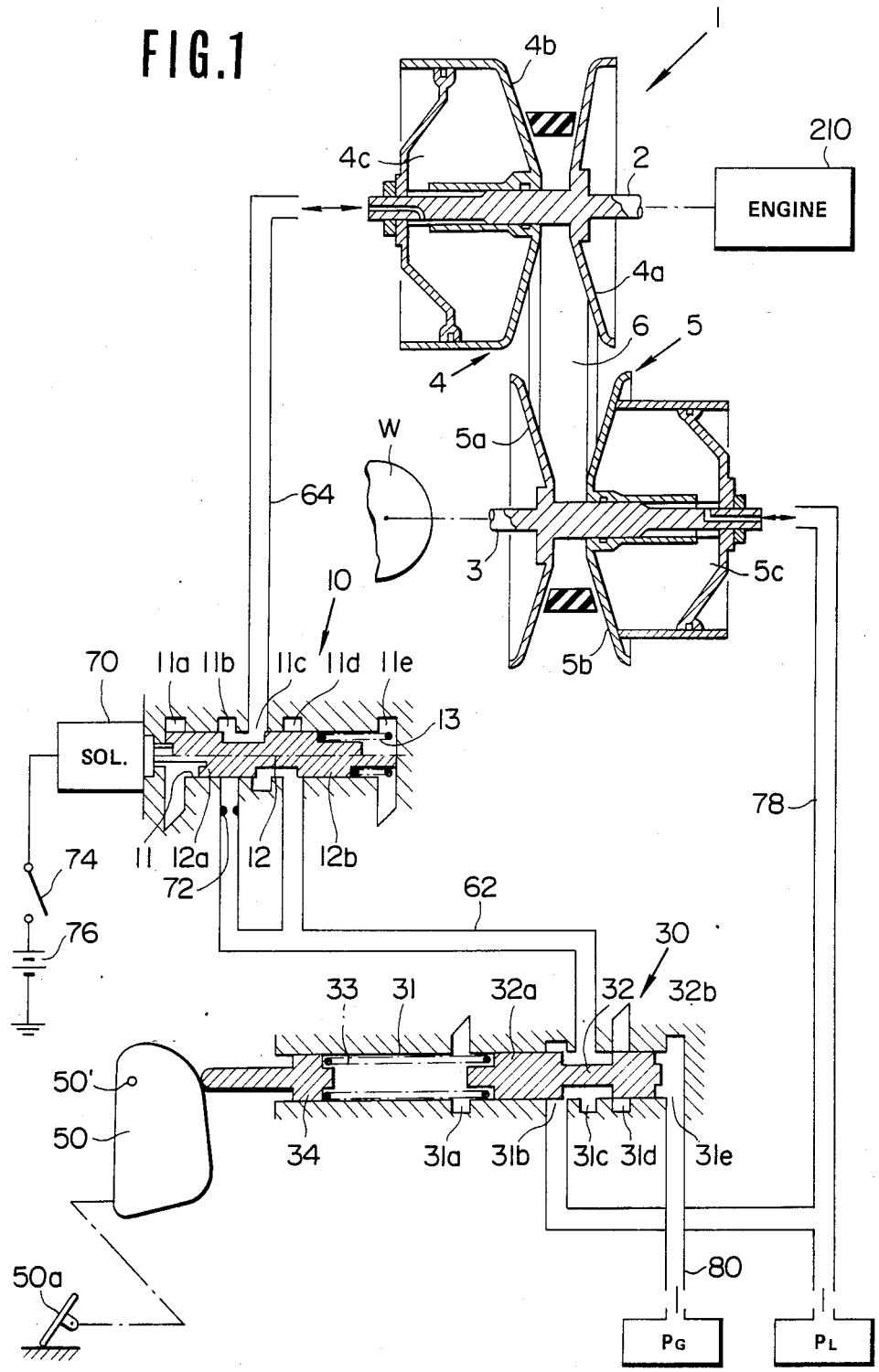
FIG. 1 is a schematic view of a hydraulic control system for a continuously variable transmission showing a first embodiment.

Referring to FIG. 1, a hydraulic control system for a continuously variable V-belt transmission 1 comprises an input member in the form of a driving shaft 2 and an output member in the form of a follower shaft 3 which are arranged in parallel. It also comprises a driving pulley 4 rotatable with the driving shaft 2 and a follower pulley 5 with the follower shaft 3, which pulleys 4 and 5 are drivingly interconnected by a belt in the form of a V-belt 6. The driving shaft 2 is drivingly connected to an internal combustion engine 210, while the follower shaft 3 drivingly connected to road wheels, one of which being denoted by W, of an automotive vehicle. The driving pulley 4 includes an axially stationary conical disc 4a fixedly mounted on the driving shaft 2, and an axially movable conical disc 4b mounted on the driving shaft 2 for axial movement along the driving shaft 2 in response to fluid pressure within a fluid pressure chamber or driving pulley cylinder chamber 4c. The conical discs 4a and 4b are therefore axially expandable and define therebetween a pulley groove which receives the V-belt 6, and they frictionally engage with the belt 6 so as to interpose or compress it with a thrust that is variable with fluid pressure within the chamber 4c. The follower pulley 5 includes an axially stationary conical disc 5a fixedly mounted on the follower shaft 3 and an axially movable conical disc 5b mounted on the follower shaft 3 for axial movement along the follower shaft 3 in response to fluid pressure within a fluid pressure chamber or follower pulley cylinder chamber 5c. The conical discs 5a and 5b are therefore axially expandable and define therebetween a pulley groove which receives the V-belt 6, and they frictionally engage with the belt 6 so as to interpose or compress it with a thrust that is variable with fluid pressure within the chamber 5c. A pressure acting area within the follower pulley cylinder chamber 5c is set such that it is smaller in area than that within the driving pulley cylinder chamber 4c.

Ratio of the rotational speed of the driving shaft 2 to that of the follower shaft 3 (a reduction ratio) is determined by a ratio between the magnitude of thrust applied to the movable conical disc 4b due to the fluid pressure within the drivingly pulley cylinder chamber 4c and the magnitude of thrust applied to the movable conical disc 5b due to the fluid pressure within the follower pulley cylinder chamber 5c. As the magnitude of thrust applied to the V-belt 6 by one of the pulleys 4 and 5 becomes larger than the magnitude of thrust applied to the V-belt 6 by the other pulley, the contacting radius of the V-belt pulley 6 with the one pulley becomes large, while the contacting radius of the V-belt 6 with the other pulley becomes small. This means that the ratio between the pulleys 4 and 5 can be continuously varied by controlling the fluid pressure within the driving pulley cylinder chamber 4c and that within the follower pulley cylinder chamber 5c.

The hydraulic control system schematically illustrated in FIG. 1 is designed for controlling the reduction ratio and comprises a change-over valve 10, a shift control valve 30, and an actuator in the form of a solenoid 70 operatively coupled with the change-over valve 10. It also comprises a source of governor pressure $P_G$ variable with the vehicle speed and a source of line fluid pressure $P_L$. The other valves which are ordinarily associated with these valves are omitted from illustration because they have nothing to do with the invention.

The change-over valve 10 is formed with a valve bore 11 slidably receiving therein a spool 12 for axial movement, and it comprises a spring 13 biasing the spool 12 to the left as viewed in FIG. 1. The spool 12 is movable between two positions in response to energization or deenergization of the solenoid 70. The valve bore 11 is formed with five ports 11a to 11e. The spool 12 is formed with two lands 12a and 12b. When the spool 12 assumes a position as illustrated in FIG. 1 by an upper half thereof, the ports 11b and 11c are allowed to communicate with each other via a chamber defined between the lands 12a and 12b. When, on the other hand, the spool 12 assumes a position as illustrated in FIG. 1 by a lower half thereof, the ports 11c and 11d are allowed to communicate with each other via the chamber defined between the lands 12a and 12b. The ports 11a and 11e are drain ports, respectively. The ports 11b and 11d are connected with a conduit 62 communicating with an outlet port 31c of the later described shift control valve 30. There is provided an orifice 72 fluidly disposed between the port 11b and the port 31c of the shift control valve 30. The port 11d is connected with the port 31c bypassing the orifice 72. The port 11c is connected with the driving pulley cylinder chamber 4c. The solenoid 70 is electrically connected and activated by a circuit 74A including a switch 74 and a power source 76. The switch 74 is adapted to be closed or opened manually by a driver of the automotive vehicle such that it is opened (OFF) when regular octane fuel is used or closed (ON) when high octane fuel is used.

The shift control valve 30 controls fluid supply to and fluid discharge from the driving pulley cylinder chamber 4c to regulate the fluid pressure therein. The fluid pressure within the other cylinder chamber 5c is as equal as the line pressure since it communicates with the source of line pressure $P_L$ via the fluid conduit 78. The valve 30 is formed with a valve bore 31 slidably receiving therein a spool 32 for axial movement and also a plunger 34 for axial movement. A spring 33 is disposed between the spool 32 and plunger 34. The valve bore 31 is formed with five ports 31a to 31e. The spool 32 is formed with two lands 32a and 32b. The ports 31a and 31d are drain ports. The port 31b is connected with the conduit 78 forming part of a line pressure circuit. The port 31c is connected with the fluid conduit 62. The port 31e is connected with a fluid conduit 80 forming part of a governor pressure circuit. The spring 33 biases the plunger 34 against a throttle cam 50 which coacts with an accelerator 50a for rotation about a pin 50'. This construction of the shift control valve 30 causes buildup, within the fluid conduit 62, of a hydraulic fluid pressure which becomes small as the throttle opening degree (i.e., the depression degree of the accelerator 50a) becomes large. But this fluid pressue becomes large as the governor pressure $P_G$ becomes high.

The operation of this embodiment is described. When the regular octane fuel is used, the switch 74 is manually turned OFF or opened. This causes deenergization of the solenoid 70, thus allowing the spool 12 of the change-over valve 10 to assume the upper half illustrated position due to the action of the spring 13. In this position of the spool 12, the ports 11b and 11c are allowed to communicate with each other, so a restricted fluid flow communication of the shift control valve 30 with the driving pulley cylinder chamber 4c via the orifice 72 is established. The follower pulley cylinder chamber 5c is always supplied with line pressure. Assuming that there is a change in depression degree of the accelerator 50a in this state, this change causes the throttle cam 50 to rotate about the pin 50'. This rotation of the throttle cam 50 causes the shift control valve 30 to vary its output fluid pressure within the fluid conduit 62. For example, increasing the degree of depression of the accelerator 50a causes an increase in the fluid pressure within the fluid conduit 62. This increase in the fluid pressure is transmitted to the driving pulley cylinder chamber 4c with a delay provided by the orifice 72. Thus, the resulting movement of the movable conical disc 4b to the right as viewed in FIG. 1 is slow and gradual, thus the reduction ratio changes at a relatively gradual rate. Therefore, a change in reduction ratio resulting from a change in depression degree of the accelerator 50a takes place with an appreciable delay. Similarly, a delay in response takes place when the depression degree of the accelerator pedal is decreased.

As will now be understood from the above description, a quick shifting in reduction ratio to a small reduction ratio is avoided, so the tendency of the engine to knock is suppressed which otherwise would be caused by the quick shifting when the regular octane fuel is used.

In the case where the high octane fuel is used, the switch 74 is manually turned ON or closed. This causes the energization of the solenoid 70. The energization of the solenoid 70 causes the spool 12 of the change-over valve 10 to assume the lower half illustrated position. In this position of the spool 12, the ports 11d and 11c are allowed to communicate with each other. As a result, the fluid conduits 62 and 64 are allowed to communicate with each other bypassing the orifice 72, so the fluid pressure produced by the shift control valve 30 is supplied to the driving pulley cylinder chamber 4c bypassing the flow restriction due to the orifice 72. Thus, an unrestricted fluid flow communication of the shift control valve 30 with the driving pulley cylinder chamber 4c is established. Asusming now that the accelerator 50a is manipulated to cause rotation of the throttle cam 50 so as to vary the fluid pressure within the fluid conduit 62 produced by the shift control valve 30, a change in the fluid pressure within the fluid conduit 62 is transmitted to the driving pulley cylinder chamber 4c quickly without any delay, so the movable conical disc 4b moves quickly. Therefore, the continuously variable transmission 1 exhibits a good shifting response to a change in depression degree of the accelerator 50a. Besides, the tendency of the engine to knock is suppressed because high octane fuel is used even if the shifting takes place quickly.

From the above description, it will now be understood that a waste of fuel which otherwise would be caused by the slow shifting when the high octane fuel is used is avoided.

Therefore, it will be appreciated that according to the first embodiment, the tendency of the engine to knock due to a switch between different kinds of fuel in octane number is suppressed, and the waste of fuel is avoided.

Second Embodiment

Figure 2:
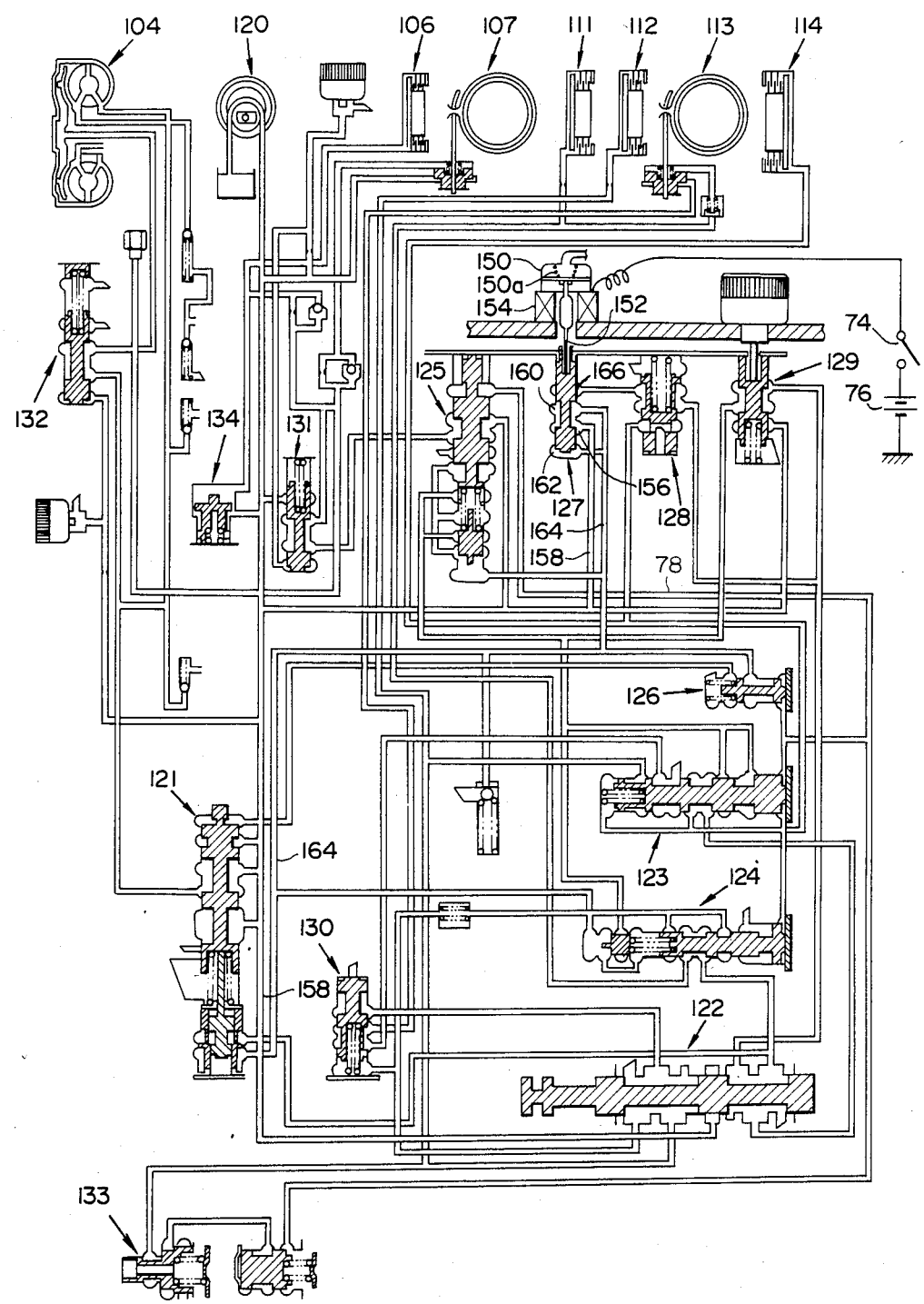
FIG. 2 is a circuit diagram of a hydraulic control system for a discretely variable transmission showing a second embodiment.

Referring to FIG. 2, a hydraulic control system for a discretely variable transmission is described. This hydraulic control system is designed for use with a four-speed automatic transmission which effects shifting between different and discrete reduction ratios including an overdrive. The following description puts emphasis on a vacuum operated throttle valve 127 and its closely associated component parts which are deemed to be closely related to the present invention. The detailed description of the other component parts is omitted for simplicity of description. The construction and operation of each of the following component parts are similar to those of the counterparts disclosed in, for example, laid-open Japanese patent application 54-132062 or 58-196373. They are a torque converter 104, a direct clutch 106, an overdrive (OD) band brake 107, a front clutch 111, a rear clutch 112, a second band brake 113, a low & reverse brake 114, a fluid pump 120, a pressure regulator valve 121, a manual valve 122, a 1-2 shift valve 123, a 2-3 shift valve 124, a 3-4 shift valve 125, a pressure modifier valve 126, a throttle back-up valve 128, a solenoid downshift valve 129, a second lock valve 130, an overdrive (OD) control valve 131, a lock-up control valve 132, a governor valve 133, and an accumulator 134.

The vacuum throttle valve 127 is connected to a vacuum diaphragm 150 via a rod 152. The rod 152 is surrounded by an electromagnetic coil 154 which is electrically connected to a power source 76 via a manual switch 74. The switch 74 is manually turned OFF when the regular octane fuel is used, while it is turned ON when high octane fuel is used. When energized, the electromagnetic coil 154 applies an upward force, as viewed in FIG. 2, to the rod 152 as opposed to a downward force applied on the rod 152 by the vacuum diaphragm 150 including a diaphragm return spring 150a. The vacuum throttle valve 127 has a port 156 connected with a line pressure fluid conduit 158. It also has ports 160 and 162 connected with a throttle fluid pressure conduit 164, and a port 166 connected with a drain port. The throttle pressure conduit 164 leads to a line pressure boost port of the line pressure regulator valve 121. The vacuum throttle valve 127 generates a throttle pressure within the throttle pressure conduit 164 using the fluid pressure supplied by the line pressure fluid conduit 158 as a source of fluid pressure. The throttle pressure has a magnitude corresponding to the magnitude of a force applied to the rod 152. The vacuum diaphragm 150 is connected with an intake pipe of the engine such that it applies to the rod 152 a force inversely proportional to the intake vacuum developed in the intake pipe.

The operation of this embodiment is described. When the regular octane fuel is used, the switch 74 is turned OFF. Thus, no current passes through the electromagnetic coil 154 and no electromagnetic force is created. Under this condition, the vacuum throttle valve 127 operates in an ordinary manner and establishes ordinary pressure regulating state where the throttle pressure generated corresponds in magnitude to a force applied to the vacuum throttle valve 127 by the vacuum diaphragm 150 via the rod 152. The throttle pressure reveals the characteristic determined by the intake vacuum created within the intake pipe of the engine. Since the intake vacuum is generally variable with the power output of the engine, the throttle pressure varies in a pattern corresponding approximately to the pattern of variation of the engine power output. This throttle pressure is applied to the 2-3 shift valve 124, and 3-4 shift valve 125 as opposed to the governor pressure, thus providing a shifting schedule where the transmission effects shifting between two gear ratios at a shift point where vehicle speed is relatively high. In accordance with this shifting schedule, an engine speed upon completion of an upshift is sufficiently high so that the tendency of engine to knock is suppressed.

When, on the other hand, high octane fuel is used, the switch 74 is turned ON, allowing the current to pass through the electromagmetic coil 154. The energization of the electromagnetic coil 154 causes application of an electromagnetic force upon the rod 152 as opposed to the force applied thereto by the vacuum diaphragm 150, resulting in a decrease in the force applied to the rod 152 by the vacuum diaphragm 150. Thus, the magnitude of the throttle pressure is decreased. This decrease in throttle pressure causes a change of the shifting schedule to a new schedule where the shift point is lowered in terms of vehicle speed down to a relatively low vehicle speed value. As a result, the engine is allowed to operate at a relatively low engine speed upon completion of an upshift. However, the tendency of the engine to knock is suppressed due to the use of the high octane fuel.

As will now be appreciated from the above description of this embodiment, the tendency of the engine to knock due to a switch between regular octane and high octane fuel is suppressed, and the waste of fuel which otherwise would be caused by the shifting schedule having a high shift point in terms of vehicle speed when the high octane fuel is used is avoided because the engine is allowed to operate at relatively low speeds.

Since the throttle pressure conduit 164 is connected with the line pressure regulator valve 121 so as to boost the line pressure, there is a drop in line pressure when the throttle pressure drops as a result of the closure of the switch 74. If this drop in line pressure is serious and causes a shortage in capacity of each of the frictional units, such as clutches and brakes, it is preferable to modify the line pressure regulator valve 121 in a manner which will be described later referring to FIG. 6.

Although, in this second embodiment, the conversion characteristic of the vacuum throttle valve 127 from vacuum to fluid pressure is switched by means of the electromagnetic coil 154, there are many other manners of accomplishing this end. For example, an air pressure valve is connected to the vacuum diaphragm 150 so when the switch 74 is turned ON, the air pressure valve is switched to cause a change in the vacuum applied to the vacuum diaphragm 150. Another example is to use a vacuum pump to change the vacuum applied to the vacuum diaphragm 150. Still another example is to fluidly connecting another valve to the vacuum throttle valve 127 so it functions to increase/decrease the throttle pressure in response to the state of the switch 74. The other example is to change the governor pressure in two stages in response to the state of the switch 74 because the governor pressure is applied to each of the shift valves as opposed to the throttle pressure.

Third Embodiment

In the first and second embodiments, the switch 74 of the manually operable type is used. The switch 74 may be operated automatically in response to the result of automatic recognition of the kinds of fuel used, so the shifting speed or shifting schedule can be changed automatically. One of such examples is hereinafter described in connection with FIG. 3.

Figure 3:
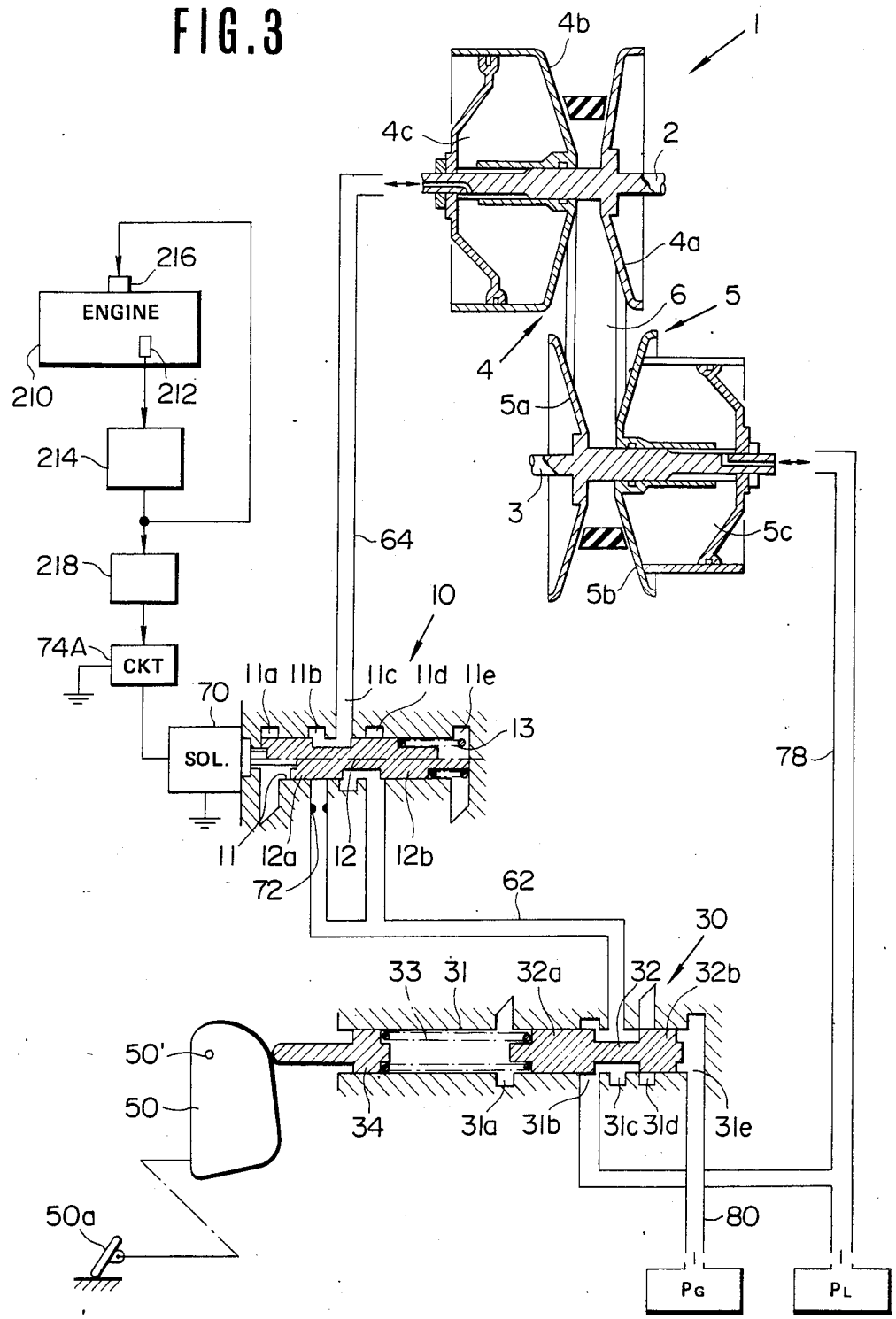
FIG. 3 is a similar view to FIG. 1 showing a third embodiment.

Referring to FIG. 3, there is shown an engine 210 with a knock sensor 212. The output signal from this knock sensor 212 is fed to an ignition timing control unit 214 where the tendency of the engine 210 to knock is detected based on the signal generated by the knock sensor 212, then it is determined which of the regular octane fuel or high octane fuel is used, and then a signal is fed to an ignition device 216 when it is determined that the regular octane fuel is used, so small degree of spark advance is provided when the regular octane fuel is used as compared to the degree of spark advance when the high octane fuel is used. This ignition timing control system is described in laid-open Japanese patent application 58-143169. The signal fed from the ignition timing control unit 214 to the ignition device 216 is fed also to an octane determining unit 218 where a decision is made whether or not the ignition timing command fed to the ignition device 216 by the ignition timing control unit 214 is disposed on the high octane side as compared to a predetermined octane number, i.e., whether or not the degree in spark advance is larger than a predetermined value. The unit 218 is connected with a control circuit 74A for a solenoid 70, so it issues a signal which causes energization of the solenoid 70 when the degree of spark advance indicates the use of the high octane fuel. The other construction is the same as that of the first embodiment.

The operation of this embodiment is hereinafter described. In the case where the engine 210 operates on regular octane fuel, the ignition timing control unit 214 provides such a signal to the ignition device 216 that the degree of spark advance is decreased to suppress the tendency to knock. This results in a decrease in degree of spark advance, thus effectively suppressing the tendency to knock. Then, the unit 218 causes deenergization of the solenoid 70 because it detects that the amount of spark advance is smaller than the predetermined value. When the solenoid 70 is not energized, the shifting takes place at a slow speed due to the function of the change-over valve 10 similarly to the first embodiment.

In the case where the engine 210 operates on the high octane fuel, the ignition timing control unit 214 generates a signal commanding the ignition device 216 to increase the amount of spark advance. Then, the unit 218 detects that the ignition timing control unit 214 generates the signal commanding the ignition device 216 to increase the amount of spark advance and thus generates a signal causing the energization of the solenoid 70. When the solenoid 70 is energized, the shifting is effcted at a quick speed similarly to the embodiment shown in FIG. 1.

Fourth Embodiment

Referring to FIG. 4, the fourth embodiment is described. This embodiment is similar to the third embodiment shown in FIG. 3 in that the energization of a solenoid 70 is controlled by a unit 218 via a control circuit 74A, and it includes a line pressure regulator valve 121A which is a modification of the line pressure regulator valve 121 shown in FIG. 2. This modified line pressure regulator valve 121A is fluidly circuited with the other component parts of a hydraulic control system in a manner similar to the line pressure regulator valve 121 is.

The solenoid 70 is provided to close or open an opening 28 of a fluid conduit 26 connected via an orifice 24 with a line pressure fluid conduit 158 (ref. FIG. 2). The fluid conduit 26 is connected with a port 32 of a line pressure regulator valve 121A. The regulator valve 121A comprises a spool 35, a plug 36, a sleeve 38, a retainer 40 and a spring 42. The pressure regulation is such that an excessive hydraulic fluid is discharged via ports 52 and 54 until balance is reached between a downward force due to hydraulic fluid pressure applied to ports 44 and 46 and the total of an upward spring force by the spring 42 and an upward force due to hydraulic fluid pressure applied to ports 48, 32 and 51, thus regulating hydraulic fluid pressure in the fluid conduit 158. The hydraulic fluid discharged from the port 52 is supplied via a fluid conduit 56 to a torque converter (see 104 in FIG. 2). The hydraulic fluid pressure is supplied to the port 48 only when a manual valve (not shown) is set to "R" (reverse) range, while a throttle pressure is always supplied via a fluid conduit 164 (see FIG. 2) to the port 51. The port 32 is connected with the fluid conduit 26 as mentioned before.

The operation of this embodiment is hereinafter described. In the case where the engine operates on regular octane fuel, the ignition timing control unit 214 supplies a command signal to the ignition device 216 so as to cause the ignition device 216 to decrease the amount of spark advance, so the tendency of the engine to knock is suppressed. This provides a small spark advance, thus preventing the occurrence of knocking. Then, the unit 218 causes the deenergization of the solenoid 70 when it detects that the signal from the ignition timing control unit 214 is smaller than a predetermined value. When the solenoid 70 is not energized, the opening 28 is uncovered, allowing drainage of hydraulic fluid from the fluid conduit 26. This causes no pressure to build up in the port 32 of the regulator valve 121A, causing a drop in line pressure to a relatively low level. This relatively low level in the line pressure is set such that the capacity of each of the frictional units, such as, clutches and brakes, adjusts to the power output produced by the engine when it operates on the regular octane fuel. Since, in this manner, the capacity of each of the frictional units is set optimum, the substantial shift shocks are suppressed and shift timing becomes optimum and desirable slip in each of the frictional units is avoided.

In the case where the engine 10 operates on high octane fuel, the ignition timing control unit 214 generates a signal commanding the ignition device 216 to provide a relatively large amount of spark advance. The use of the high octane fuel in combination with the large spark advance results in an increase in power output of the engine 210. Then, the unit 218 generates a signal that causes the energization of the solenoid 70 when it detects that the ignition timing control unit 214 generates the signal commanding an increase in the amount of spark advance. When the solenoid 70 is energized, the opening 28 is closed, allowing the fluid pressure as high as the line pressure to build up in the fluid conduit 26. This fluid pressure is applied to the port 32 of the regulator valve 121A, applying an upward force, as viewed in FIG. 4, to the plug 36. This boosts the line pressure by an amount corresponding to this upward force to a relatively high level. The line pressure having this relatively high level causes an increase in the capacity of each of the frictional units in correspondance with the increase in the power output of the engine 210. Therefore, in this case too, the capacity of each of the frictional units is adjusted to the engine output. Therefore, even in the case where the engine output is increased when the engine operates on the high octane fuel, the substantial shift shocks are suppressed, the shift timings are optimum and no undesirable slip takes place in each of the frictional units.

Figure 5:
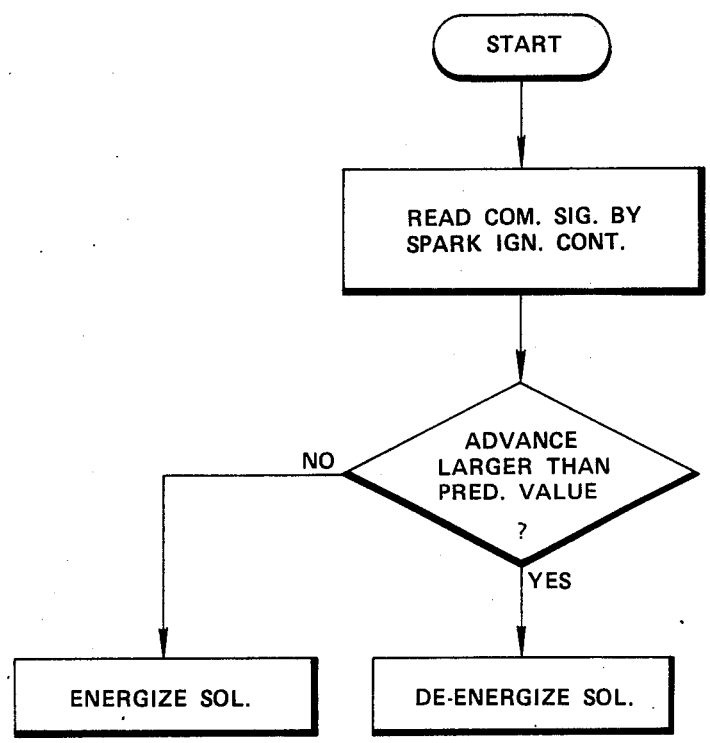
FIG. 5 is a flowchart.

The above described job steps can be implemented by a controller including a microcomputer as will be readily understood from a flowchart shown in FIG. 5.

From the above description of this embodiment, it will now be understood that the level of the line pressure is automatically switched from one level to another in response to a difference in the engine output due to the difference in kinds of fuel used by the engine, so the capacity of each of the frictional units is always set optimum. Therefore, even when the engine operates on the regular octane or high octane fuel as the case may be, an excessive increase in slip in the frictional units and an increase in shift shocks are eliminated.

Fifth Embodiment

Referring to FIG. 6, the last embodiment is described. This embodiment is substantially the same as the previously described embodiment in connection with FIG. 4, but it is different from the same in that instead of a control assembly including the knock sensor 212, ignition timing control unit 214, and the unit 218, a manually operable switch 74 is used similarly to the counterpart in FIG. 1.

In this embodiment, the driver himself or herself manually operates the switch 74 in response to which one of the two kinds of fuel, i.e., regular octane fuel or high octane fuel, is used. That is, when the high octane fuel is used, the switch 74 is closed or turned ON, while, when the regular octane fuel is used, it is turned OFF. If desired, a display may be provided indicating the high octane or regular octane in response to the position ON or OFF of the switch 74. When the switch 74 is turned ON in response to the use of high octane fuel, the solenoid 70 is energized to close an opening 28 of a fluid conduit 26, resulting in an increase in line pressure. Although, the manual operation is needed in this embodiment, the manufacturing cost can be suppressed.

What is claimed is:

1. In a vehicle having a road wheel and an engine, wherein the tendency of the engine to knock differs depending on octane number of fuel which the engine operates on:
   a transmission having an input member drivingly connected to the engine to receive the output produced by the engine and an output member drivingly connected to the road wheel;
   said transmission being adapted to effect a shift in ratio between the rotational speed of said input member and the rotational speed of said output member;
   means for hydraulically controlling said transmission;
   means for generating a fuel octane number indicative signal when a change occurs in octane number of fuel on which the engine is operating; and
   means including a solenoid operatively coupled with said fuel octane number indicative signal generating means for modifying operation of said hydraulically controlling means in response to said fuel octane number indicative signal.

2. The combination as claimed in claim 1, wherein said fuel octane number indicative signal generating means includes a change-over switch having a first position and a second position.

3. The combination as claimed in claim 1, wherein said transmission comprises:
   a driving pulley rotatable with said input member, a follower pulley rotatable with said output member, and a belt drivingly interconnecting said driving and follower pulleys, each of said driving and follower pulleys including a pair of axially expandable conical discs defining therebetween a pulley groove receiving said belt and frictionally engaging with said belt so as to apply a thrust to said belt;
   said ratio being determined by a ratio between the magnitude of the thrust applied to said belt by said driving pulley and the magnitude of the thrust applied to said belt by said follower pulley;
   one of said driving and follower pulleys having means, including a fluid pressure chamber, for urging one of said pair of conical discs thereof toward the other thereof, thus varying the magnitude of said thrust force in response to a variation in said fluid pressure within said fluid pressure chamber; and
   wherein said hydraulically controlling means includes:
   shift control valve means for regulating fluid supply to and fluid discharge from said fluid pressure chamber so as to regulate the magnitude of said fluid pressure in such a manner as to vary said ratio between the rotational speed of said input member and that of said output member; and
   wherein said modifying means includes:
   a change-over valve fluidly disposed between said shift control valve means and said fluid pressure chamber and having a first position wherein a restricted fluid flow communication between said shift control valve means and said fluid pressure chamber is established and a second position wherein an unrestricted fluid flow communication between said shift control valve means and said fluid pressure chamber is established;
   said solenoid being operatively coupled with said change-over valve means and energized in response to said fuel octane number indicative signal to shift said change-over valve means from one of said first and second positions thereof to the other.

4. The combination as claimed in claim 3, wherein said fuel octane number indicative signal generating means includes a manually operable switch.

5. The combination as claimed in claim 3, wherein said fuel octane number indicative signal generating means includes:
   knock sensor means mounted on the engine for generating a sensor output signal indicative of the occurrence of knock within the engine;
   means for receiving said sensor output signal, deciding the octane number of the fuel based on said sensor output signal and generating said fuel octane number indicative signal.

6. The combination as claimed in claim 1, wherein said hydraulically controlling means comprises:
   shift valve means shiftable between a downshift position and an upshift position for causing said transmission to effect shifting in said ratio between the rotational speed of said input member and the rotational speed of said output member so that the transmission effects shifting in accordance with a first predetermined schedule involving a vehicle speed that is related to the rotational speed of said output member; and
   wherein said modifying means
   modifies the operation of said shift valve means and changes said first predetermined schedule to a second predetermined schedule.

7. The combination as claimed in claim 1, wherein said transmission comprises
   a plurality of frictional units for effecting shifting;
   wherein said hydraulically controlling means includes
   pressure regulator valve means for generating a frictional unit actuating line fluid pressure which is variable in a first predetermined pattern corresponding approximately to the pattern of variation of power output of the engine, said pressure regulator valve means supplying said frictional unit actuating line fluid pressure to said frictional units selectively to actuate said frictional units; and wherein said electrohydraulic transducer means modifies the operation of said pressure regulator valve means and changes said first predetermined pattern of variation of said frictional unit actuating line fluid pressure to a second predetermined pattern and causes said pressure regulator valve means to supply a modified frictional unit actuating line fluid pressure variable in said second predetermined pattern to said frictional units selectively to actuate said frictional units.

8. The combination as claimed in claim 7, wherein said fuel octane number indicative signal generating means includes:

knock sensor means mounted on the engine for generating a sensor output signal indicative of the occurrence of knock within the engine;

means for receiving said sensor output signal, deciding the octane number of the fuel based on said sensor output signal and generating said fuel octane number indicative signal.

9. The combination as claimed in claim 7, wherein the fuel octane number indicative signal generating means includes a manually operable switch.

10. In a vehicle having a road wheel and an engine for operating on a fuel having an octane number, wherein the tendency of the engine to knock differs depending on the octane number of the fuel:

a transmission having an input member drivingly connected to the engine to receive the output produced by the engine and an output member drivingly connected to the road wheel;

said transmission being constructed to produce a shift in ratio between the rotational speed of said input member and the rotational speed of said output member;

means for hydraulically controlling said transmission;

means for generating a fuel octane number indicative signal when a change in octane number of the fuel on which the engine is operating occurs; and means for modifying operation of said hydraulically controlling means in response to said fuel octane number indicative signal.

* * * * *